United States Patent Office 2,891,073
Patented June 16, 1959

2,891,073

POLYEPICHLOROHYDRIN BIS(2,3-CARBONATOPROPYL ETHER)

Robert M. Smith, Odessa, Tex., assignor to The Dow Chemical Company, Midland, Mich., a corporation of Delaware No Drawing. Application November 8, 1957
Serial No. 695,187

2 Claims. (Cl. 260—340.2)

This invention relates to a new resinous material consisting of polyepichlorohydrin bis(2,3-carbonatopropyl ether).

Polyepichlorohydrin is a well known material produced by the polymerization of epichlorohydrin. Such polymerization is initiated by traces of water, glycerol chlorohydrin or other polyfunctional compounds which are either incidentally present in the epichlorohydrin or are deliberately added for the purpose. The resulting polymer may be represented by the formula

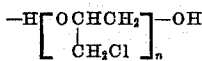

wherein $n$ may be an integer from 1 to about 100 or more, though it is to be understood that the polyepichlorohydrin chain may contain, as a starter, a difunctional radical derived from a dihydroxy compound other than glycerol chlorohydrin. Since the starter ordinarily constitutes only a very minor part of the polymer chain, its identity has little or no significant influence on the properties of the polymer.

It may be seen from the above formula that polyepichlorohydrin is a polychloro glycol. The two hydroxyl groups are available for etherification, and the present invention is concerned with the 2,3-carbonatopropyl ether of polyepichlorohydrin. The latter may be represented by the formula

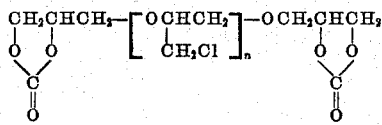

wherein $n$ is an integer from 2 to 100 or more.

The compounds of the invention may be conveniently prepared by the reaction of carbon dioxide with the corresponding diglycidyl ether of polyepichlorohydrin. This reaction is catalyzed by alkaline catalysts such as aliphatic amines or, preferably, alkaline ion-exchange resins. Such conversion of epoxide to cyclic carbonate is well known, suitable general procedures being shown in U.S. Patents 2,773,070 and 2,773,881 and in the copending application of William A. Rogers, Jr., et al., Serial No. 614,051, filed October 5, 1956.

The practice of the invention is illustrated by the following examples.

PREPARATION OF DIGLYCIDYL ETHER OF POLYEPICHLOROHYDRIN

Polyepichlorohydrin was prepared by slowly adding epichlorohydrin (370 g.) to propylene glycol (76 g.) containing 0.5% $BF_3$ etherate at a temperature of 40°–45° C. After all the epichlorohydrin has been added, the reaction mixture was allowed to digest at the same temperature for 2 hours. The polyepichlorohydrin obtained had a molecular weight of 450.

The polymer product was then diluted with 100 ml. of benzene and 5 ml. of water. 27 g. of solid NaOH was added, with stirring, and the temperature was brought to 60–70° C. The mixture was allowed to digest for 2 hours at this temperature. A second 27 g. of NaOH was then added, and a second 2-hour digestion period followed. Then a third 27 g. portion of NaOH was added and the temperature was raised to 80°–90° C. and held there for 2 hours.

The benzene and water were flashed off at 125° C. and 4–5 mm. Hg. The solid NaCl was filtered from the liquid product, found by analysis (with pyridine hydrochloride) to be the diglycidyl ether of polyepichlorohydrin.

Example 1

A one gallon reactor was charged with 100 gm. of Dowex-2 resin, a strongly basic anion-exchange resin described more fully in U.S. Patent 2,613,099, and 800 gm. of a diglycidyl ether of polyepichlorohydrin of an average degree of polymerization of about 5, the ether having an epoxy oxygen content of 7.1%. This mixture was pressured to 500 p.s.i.g. with carbon dioxide and heated to 132° C. for a period of 12 hours.

Analysis of the reaction product showed 2.3% hydroxyl, 0.17% epoxide oxygen and 21.7% carbonate as $CO_3$. Infrared spectra clearly demonstrated the presence of cyclic carbonate. Theoretical composition is 26.6% $CO_3$ as cyclic carbonate. Based on initial and residual epoxide this shows a conversion of 97% and a yield of 83.5%.

Example 2

The above experiment was duplicated except that the diglycidyl ether used was made from polyepichlorohydrin of average molecular weight about 1250 and the $CO_2$ pressure was 200 p.s.i.g. The product thus obtained contained 10.3% of cyclic carbonate and only bare traces of epoxide. This corresponded to an 88% yield of carbonate.

The products were viscous liquids having no measurable boiling or freezing points.

When the diepoxides of polyepichlorohydrin used in the above examples were replaced with similar diepoxides of polyepichlorohydrin of higher or lower molecular weight, similar products were obtained, the principal difference being that the viscosity of the final product varied in the same direction as the molecular weight of the polyepichlorohydrin from which it was derived.

The products of the invention are, in general, viscous liquids, substantially insoluble in water but readily soluble in many organic solvents. They are valuable resin intermediates because of their high functionality and high reactivity toward resin-forming reactants such as polybasic acids, urea, melamine, alkali metal salts of polyhydric alcohols or phenols, and, especially, polyamines.

The polyamines are a preferred class of resin-forming reactants for use with the dicarbonates of the invention because they are reactive with both the carbonate groups and the chloromethyl groups of the dicarbonates. When the dicarbonate is reacted with an equimolecular amount of an aliphatic diamine, it is believed the reaction takes place primarily, if not exclusively, between the carbonate and amino groups, whereby a polyhydroxy polychloro polyurethane is formed. If, however, a higher amine, such as a polyalkylenepolyamine, or a molar excess of diamine, is used, so that the total number of amino groups exceeds the total number of carbonate groups in the reactants, it is believed some of them react with the chlorine in the polyepichlorohydrin compound, thus producing a three-dimensional or cross-linked polymeric product.

The reaction of the dicarbonates of the present invention with aliphatic polyamines and the products thus produced are more fully described and claimed in the copending application of Arthur E. Gurgiolo et al., Serial No. 693,515, filed October 31, 1957.

I claim:
1. A bis-(2,3-carbonatopropyl ether) of polyepichlorohydrin.
2. A bis(2,3-carbonatopropyl ether) of a polymer consisting essentially of polyepichlorohydrin.

References Cited in the file of this patent
UNITED STATES PATENTS

| | | |
|---|---|---|
| 2,773,070 | Lichtenwalter et al. | Dec. 4, 1956 |
| 2,773,881 | Dunn | Dec. 11, 1956 |